(No Model.) 2 Sheets—Sheet 1.

H. JAQUETTE.
BEATER OR STIRRER.

No. 509,665. Patented Nov. 28, 1893.

Witnesses:
F. D. Goodwin
R. Schleicher

Inventor:
Harry Jaquette
by his Attorneys
Howson & Howson (No Model.) 2 Sheets—Sheet 2.

H. JAQUETTE.
BEATER OR STIRRER.

No. 509,665. Patented Nov. 28, 1893.

Witnesses:
F. L. Goodwin
R. Schleicher

Inventor:
Harry Jaquette
by his Attorneys
Howson & Howson

UNITED STATES PATENT OFFICE.

HARRY JAQUETTE, OF PHILADELPHIA, PENNSYLVANIA.

BEATER OR STIRRER.

SPECIFICATION forming part of Letters Patent No. 509,665, dated November 28, 1893.

Application filed May 16, 1892. Serial No. 433,109. (No model.)

*To all whom it may concern:*

Be it known that I, HARRY JAQUETTE, a citizen of the United States, and a resident of Philadelphia, Pennsylvania, have invented certain Improvements in Culinary Beaters or Stirrers, of which the following is a specification.

The object of my invention is to so construct an implement for beating or stirring materials in performing different culinary operations that said implement can be conveniently handled and the maximum amount of power exerted in order to cause the rotation, first in one direction and then in the opposite direction, of the beating or stirring device. This object I attain by providing said beating or stirring device with two handles pivoted together so as to be movable one in respect to the other, and with gearing whereby when the outer or free ends of the handles are moved toward or from each other the back and forth rotations of the beater or stirrer will be effected, the implement being held in both hands and being therefore much more convenient to manipulate than a beater one portion of which is stationary.

Figure 1:
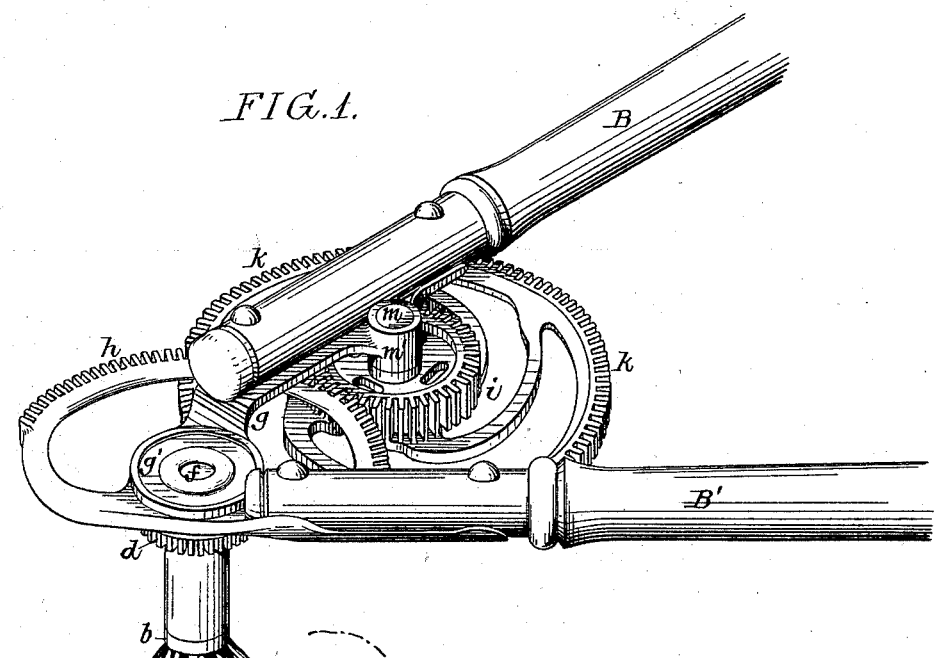
Figure 4:
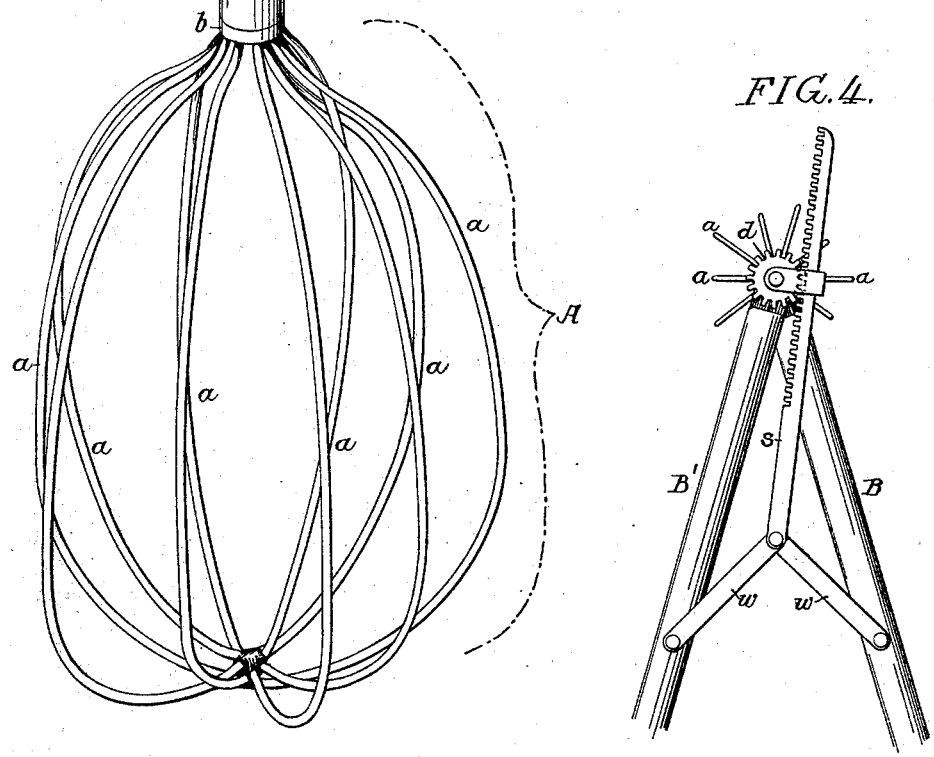
Figure 2:
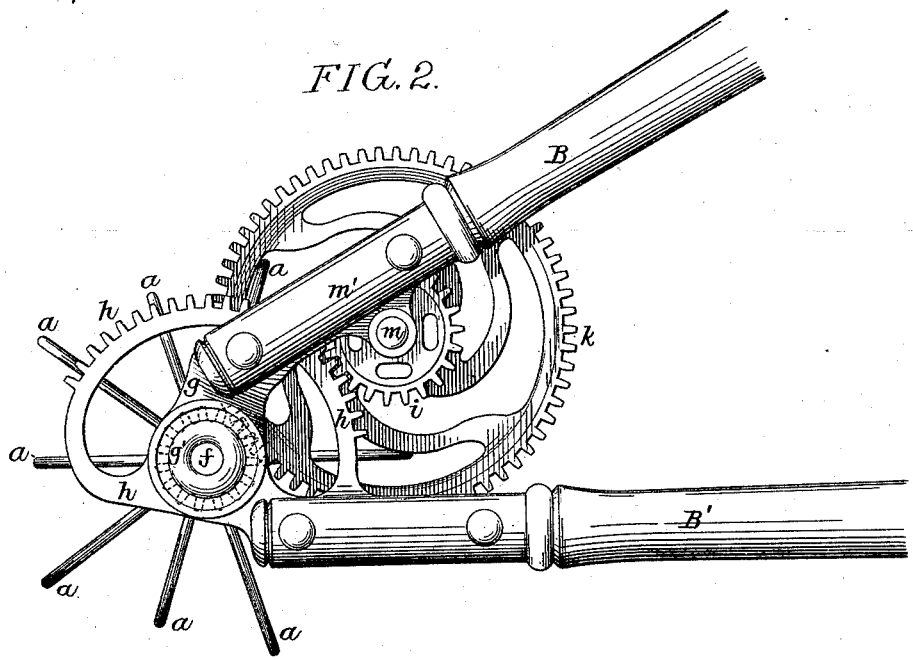
Figure 3:
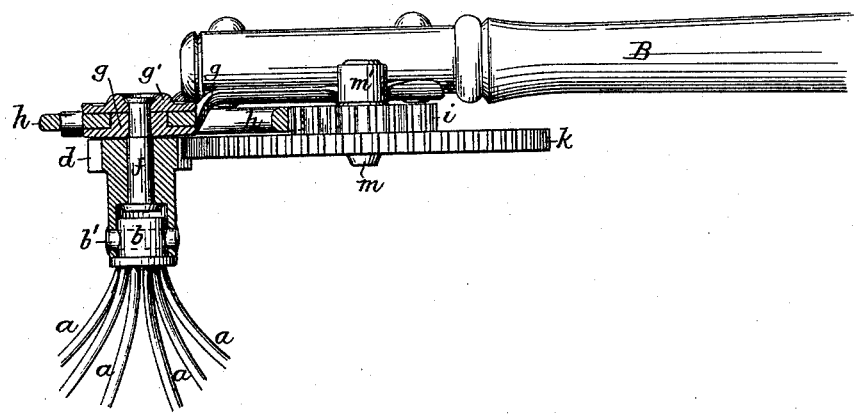

In the accompanying drawings:—Figure 1, is a perspective view of a culinary beater or stirrer constructed in accordance with my invention. Fig. 2, is a plan view of the same. Fig. 3, is a view partly in section and partly in elevation; and Fig. 4, is a diagram illustrating a modification.

In all of the views portions of the handles are broken away.

That portion of the device which constitutes the actual beater or stirrer, that is to say, the portion which acts upon the material under treatment, is in the form of an open skeleton frame A composed of wires $a$ suitably united at their lower ends and connected at the upper ends to a head $b$ which is secured by a transverse pin $b'$, or in any other appropriate manner, to the hub of a spur pinion $d$ mounted so as to turn freely upon a pin $f$, the upper end of which is reduced in diameter so as to pass through an opening in a plate $g$ carried by one of the handles B of the implement, to which plate the pin $f$ is confined by riveting the outer end of the same upon a cap plate or washer $g'$ which bears upon a central projecting stud formed upon the plate $g$. Surrounding this projecting stud of the plate $g$, but free to move between the bottom of the plate and the cap plate or washer $g'$, is the hub of a toothed segment plate $h$ which is secured to the handle B' of the implement, this toothed segment meshing with a spur pinion $i$ which is secured to or forms part of a spur wheel $k$ meshing with the pinion $d$, both the pinion $i$ and the spur wheel $k$ being adapted to turn freely upon a pin $m$ carried by a projecting stud $m'$ on that portion of the plate $g$ which is secured to the handle B. It will be evident, therefore, that when the outer ends of the handles B B' are grasped in the hands and moved toward and from each other there will be a rapid rotation of the stirrer or beater A first in one direction and then in the opposite direction, the rotation being due to the engagement of the toothed segment $h$ with the spur pinion $i$ and of the spur wheel $k$ with the pinion $d$, and the speed of rotation being due to the relative diameters of said toothed segment $h$ and spur wheel $k$ in respect to the diameters of the pinions $i$ and $d$.

As the implement is held in both hands and as power is applied to both of the handles, the beater or stirrer can be readily supported in any desired position and can be driven more forcibly than when but one handle is movable, while owing to the fact that the axis of the beater is coincident with the axis of vibration of the two handles, said beater can be steadily held in one position no matter how rapid nor how extensive the movement of the handles toward or from each other.

The essential features of my invention may, however, be attained even in cases where the axis of the beater or stirrer is not the same as the pivotal axes of the handles, although the latter construction is preferred, and while the gearing illustrated is a simple and convenient form of gearing whereby the vibrating movement of the handles is caused to impart rapid back and forth movements of rotation to the beater or stirrer, such gearing may be modified without departing from the essential features of my invention.

In Fig. 4 for instance I have shown a modified form of the implement, in which the pinion $d$ of the beater meshes with a reciprocating rack *s* which is connected at its inner end to links *w w* one pivoted to one handle and the other to the opposite handle, these links forming a toggle joint and causing movement of the rack, as the handles are moved together or separated.

Having thus described my invention, I claim and desire to secure by Letters Patent—

1. A culinary beater or stirrer in which are combined a beater, a pair of handles pivoted together and each movable in respect to the other in a plane at right angles to the axial line of the beater, and gearing whereby the movement of the handles is transmitted to the beater, substantially as specified.

2. A culinary beater or stirrer in which are combined a pair of handles pivoted together, a beater having its axis of rotation coincident with the pivotal axes of the handles, and gearing whereby the movement of the handles is transmitted to said beater, substantially as specified.

3. A culinary beater or stirrer in which are combined a pair of handles pivoted together, a rotary beater having a pinion, a toothed segment carried by one handle and a spur wheel and pinion carried by the other handle, the latter pinion meshing with the toothed segment, and the spur wheel meshing with the beater pinion, substantially as specified.

4. The combination of the beater and its pinion, the pair of handles, the pinion spindle confined to a plate carried by one of the handles, a toothed segment plate carried by the other handle, and turning on a bearing on the first plate, and intermediate gearing also carried by said first plate and serving to transmit the movement of the toothed segment to the beater, substantially as specified.

In testimony whereof I have signed my name to this specification in the presence of two subscribing witnesses.

HARRY JAQUETTE.

Witnesses:
WILLIAM D. CONNER,
HARRY SMITH.